(12) United States Patent  
Eromäki

(10) Patent No.: US 7,777,782 B2  
(45) Date of Patent: Aug. 17, 2010

(54) STABILIZATION OF AN IMAGE PRODUCED BY OPTICS

(75) Inventor: Marko Eromäki, Tampere (FI)

(73) Assignee: Nokia Corporation, Espoo (FI)

( * ) Notice: Subject to any disclaimer, the term of this patent is extended or adjusted under 35 U.S.C. 154(b) by 1317 days.

(21) Appl. No.: 11/267,394

(22) Filed: Nov. 4, 2005

(65) Prior Publication Data

US 2007/0103555 A1    May 10, 2007

(51) Int. Cl.
*H04N 5/228* (2006.01)
(52) U.S. Cl. .................................................. 348/208.4
(58) Field of Classification Search .. 348/208.1–208.99
See application file for complete search history.

(56) References Cited

U.S. PATENT DOCUMENTS

| | | | |
|---|---|---|---|
| 5,589,239 A | 12/1996 | Tomono et al. | 428/34 |
| 6,278,842 B1 | 8/2001 | Yamazaki et al. | 396/55 |
| 6,307,678 B2 * | 10/2001 | Kosaka et al. | 396/52 |
| 6,532,340 B1 * | 3/2003 | Sato | 396/52 |
| 2001/0022688 A1 | 9/2001 | Kosaka et al. | 359/557 |
| 2001/0025477 A1 | 10/2001 | Hara et al. | 60/39.02 |
| 2003/0067544 A1 | 4/2003 | Wada | 348/208.7 |
| 2004/0013420 A1 | 1/2004 | Hara | 396/55 |
| 2004/0227063 A1 * | 11/2004 | Viinikanoja | 250/216 |
| 2006/0017818 A1 * | 1/2006 | Enomoto | 348/219.1 |
| 2006/0092285 A1 * | 5/2006 | Shin | 348/208.7 |
| 2006/0272328 A1 | 12/2006 | Hara et al. | 60/527 |

FOREIGN PATENT DOCUMENTS

| | | |
|---|---|---|
| EP | 0 253 375 B1 | 2/1993 |
| EP | 0 572 976 | 12/1993 |
| EP | 1 304 872 A1 | 4/2003 |
| JP | 2003 161975 (A) | 6/2003 |

OTHER PUBLICATIONS

Product line for Panasonic LUMIX digital still cameras from Lumix website, 2005.

* cited by examiner

*Primary Examiner*—Gevell Selby
(74) *Attorney, Agent, or Firm*—Harrington & Smith

(57) ABSTRACT

An electronic device is disclosed, which includes an image sensor, an optics for forming an image on the image sensor, a detector for detecting a movement effect caused by an external source aimed to the device in connection with an imaging procedure and an optical image stabilizer unit arranged to actuate at least part of the said optics in order to compensate the detected movement effect caused by the external source. The actuation of the said optics is based on deformations arranged to take place in the optical image stabilizer unit. In addition the invention also relates to corresponding method, optical image stabilizer unit and program product for actuating the said unit.

25 Claims, 5 Drawing Sheets

Lens at lower left corner

Lens at top left corner

Lens at top right corner

Lens at lower right corner

STABILIZATION OF AN IMAGE PRODUCED BY OPTICS

FIELD OF THE INVENTION

The invention relates to an electronic device, which includes
- an image sensor,
- an optics for forming an image on the image sensor,
- a detector for detecting a movement effect caused by an external source aimed to the device in connection with an imaging procedure and
- an optical image stabilizer unit arranged to actuate at least part of the optics in order to compensate the detected movement effect caused by the external source.

In addition, the invention also concerns method, optical image stabilizer unit and corresponding program product for actuating the said unit.

BACKGROUND OF THE INVENTION

In certain situations when users of digital imaging apparatuses perform an imaging procedure, for example, with high resolution/zoom factor, low sensitivity sensor, long exposure time (night-shot) and with a lightweight device (e.g. mobile phone), hand shaking can very easily result blurred, out-of-focus images. This effect can be avoided with image stabilizer application (or anti-shake).

Basically there are three ways to solve the problem described above: 1) using a rigid fixture for the camera (e.g. tripod) during shooting, 2) increase the weight of the camera device so that shaking has less effect or 3) use an built-in stabilization system. Since using tripod is not always possible and increasing weight is less practical, the stabilization is a better feature for small mobile products including camera unit.

Image stabilization has not yet widely being implemented in commercially available mobile phones, but it exists already in mid-range digital still cameras (e.g. Panasonic models [1]). In cameras the balancing effect can be implemented by moving the optics (lens) or sensor. From these two, the moving of the lens results much more practical implementation sizewise.

European Patent Application EP-0 253 375 presents a solution in which image sensor is moved. However, this solution is not suitable for commercial digital cameras or mobile phones. This solution is aimed to the mask matching of the integrated circuits. These applications require an option to correct the inclination of the solid-state image sensor.

European Patent Application EP-0 572 976 presents a solution in which part of the optics is moved. This is performed based on the response that is caused by the external source detected in connection with the imaging process. However, this publication doesn't speak out the technical implementation of the optical image stabilizer unit that performs the actuation of the optics.

Additionally, the prior art solutions must have the separate arrangements to detect the position of the corrective lens relative to the sensor. In order to measure this there must be arranged some particular detector to measure this. This complicates the implementations of the optical image stabilizer units.

SUMMARY OF THE INVENTION

The purpose of the present invention is to bring about a way to stabilize the image that is produced by the optics on the image sensor. In the invention stabilization is based on optical stabilizing. The characteristic features of the electronic device according to the invention are presented in the appended claims. Thus, according to an embodiment of the invention, an electronic device is disclosed. The electronic device includes an image sensor, an optics for forming an image on the image sensor, a detector for detecting a movement effect caused by an external source aimed to the device in connection with an imaging procedure and an optical image stabilizer unit arranged to actuate at least part of the said optics in order to compensate the detected movement effect caused by the external source. The actuation of the optics is based on deformations arranged to take place in the optical image stabilizer unit.

According to another embodiment of the invention, a method in a digital imaging procedure is disclosed. In connection with the imaging procedure, a movement effect is detected caused by an external source aimed to the device and at least part of optics arranged to form an image on an image sensor is actuated based on the said detected movement effect. The actuation of the optics is based on deformations.

In addition, the invention also concerns optical image stabilizer unit and program product for actuating this unit, whose characteristic features are presented in the appended claims. Thus, according to an embodiment of the invention, disclosed is an optical image stabilizer unit for an electronic device including a camera unit which camera unit includes an image sensor and an optics for forming an image on the image sensor. The optical image stabilizer unit may be arranged to actuate at least part of the optics in order to compensate the detected movement effect caused by the external source. The actuation of the optics is based on deformations arranged to be taken place in the optical image stabilizer unit.

According to another embodiment of the invention, disclosed is a program product for actuating an optical image stabilizer unit in an electronic device including a camera unit. The program product includes a storing means and a program code executable by a processor and written in the storing means. The program code includes first code means configured to detect a movement effect caused by an external source aimed to the device in connection with an imaging procedure and second code means configured to actuate at least part of the said optics arranged to form an image on an image sensor by the said optical image stabilizer unit which actuation is configured to base on the said detected movement effect. The program code includes third code means configured to cause deformations in connection with the optical image stabilizer unit in order to actuate the optics.

The electronic device according to the invention includes an image sensor, an optics for forming an image on the image sensor, a detector for detecting a movement effect caused by an external source aimed to the device in connection with an imaging procedure and an optical image stabilizer unit arranged to actuate at least part of the said optics in order to compensate the detected movement effect caused by the external source. In the electronic device the actuation of the said optics is based on deformations arranged to take place in the optical image stabilizer unit.

Furthermore, the invention concerns also method in digital imaging procedure in which method in connection with the imaging procedure is detected a movement effect caused by an external source aimed to the device and at least part of optics arranged to form an image on an image sensor is actuated based on the said detected movement effect. In the method the actuation of the said optics is based on deformations.

Furthermore, the optical image stabilizer unit to which the invention also relates, is intended to an electronic device including a camera unit which camera unit includes an image sensor and an optics for forming an image on the image sensor, and which said optical image stabilizer unit may be arrange to actuate at least part of the said optics in order to compensate the detected movement effect caused by the external source. In the unit the actuation of the said optics is based on deformations arranged to be taken place in the optical image stabilizer unit.

Furthermore, the program product for actuating an optical image stabilizer unit in a electronic device including a camera unit, includes a storing means and a program code executable by a processor and written in the storing means, and which program code includes first code means configured to detect a movement effect caused by an external source aimed to the device in connection with an imaging procedure and second code means configured to actuate at least part of the said optics arranged to form an image on an image sensor by the said optical image stabilizer unit which actuation is configured to base on the said detected movement effect. The program code includes also third code means configured to cause deformations in connection with the said optical image stabilizer unit in order to actuate the said optics.

Owing to the invention, numerous advantages to carry out image stabilized digital imaging are achieved. A first advantage relates to the actuation process itself in which the corrective lens is actuated. By using such materials in the optical image stabilizer unit which operation is based on deformations it is possible to achieve very precise control for the actuated optics. Owing to precise control a good compensation is achieved and owing to that the quality of produced images will be better.

The second improvement achieved with the invention is that it simplifies the practical implementation of the optical image stabilizer units and, thus, also the camera and device mechanics. In addition, the electrical implementation will be simplified. Owing to the invention and materials applied in the actuation removes the need for particular feedback arrangements and buses in order to define the current lens position. This simplifies the arrangement of signal buses and also the electronics of the device. Due to the phenomena that is applied in the invention the current position of the optical image stabilizer unit and, thus, also the optics may be determined directly from the electrical properties of the actuator means. This kind of utilization of electrical measure generated by an actuation signal and nature of the actuator material removes need for measure some secondary measures known from prior art. This provides also accuracy to the determination of the position of the corrective optics.

Thirdly, the invention improves also the robustness of the devices. The unit are equipped with limiting structures that limit the path of the optics. By means of limiting structures there are provided safe path for the lens between allowed extreme positions. If powerful external impacts direct to the device, these structures prevent the damaging of the optics in the unit and also safes the mechanics of the unit around the optics.

Fourthly, the optical image stabilizer unit according to the invention is very compact ensemble. It is very adaptable to different type of digital imaging devices. It is possible to integrate to camera devices as well as to mobile phones.

Other characteristic features of the invention will emerge from the appended Claims, and more achievable advantages are listed in the specification.

BRIEF DESCRIPTION OF THE DRAWINGS

The invention, which is not limited to the embodiments to be presented in the following, will be described in greater detail by referring to the appended figures, wherein.

DETAILED DESCRIPTION OF THE INVENTION

Figure 1:
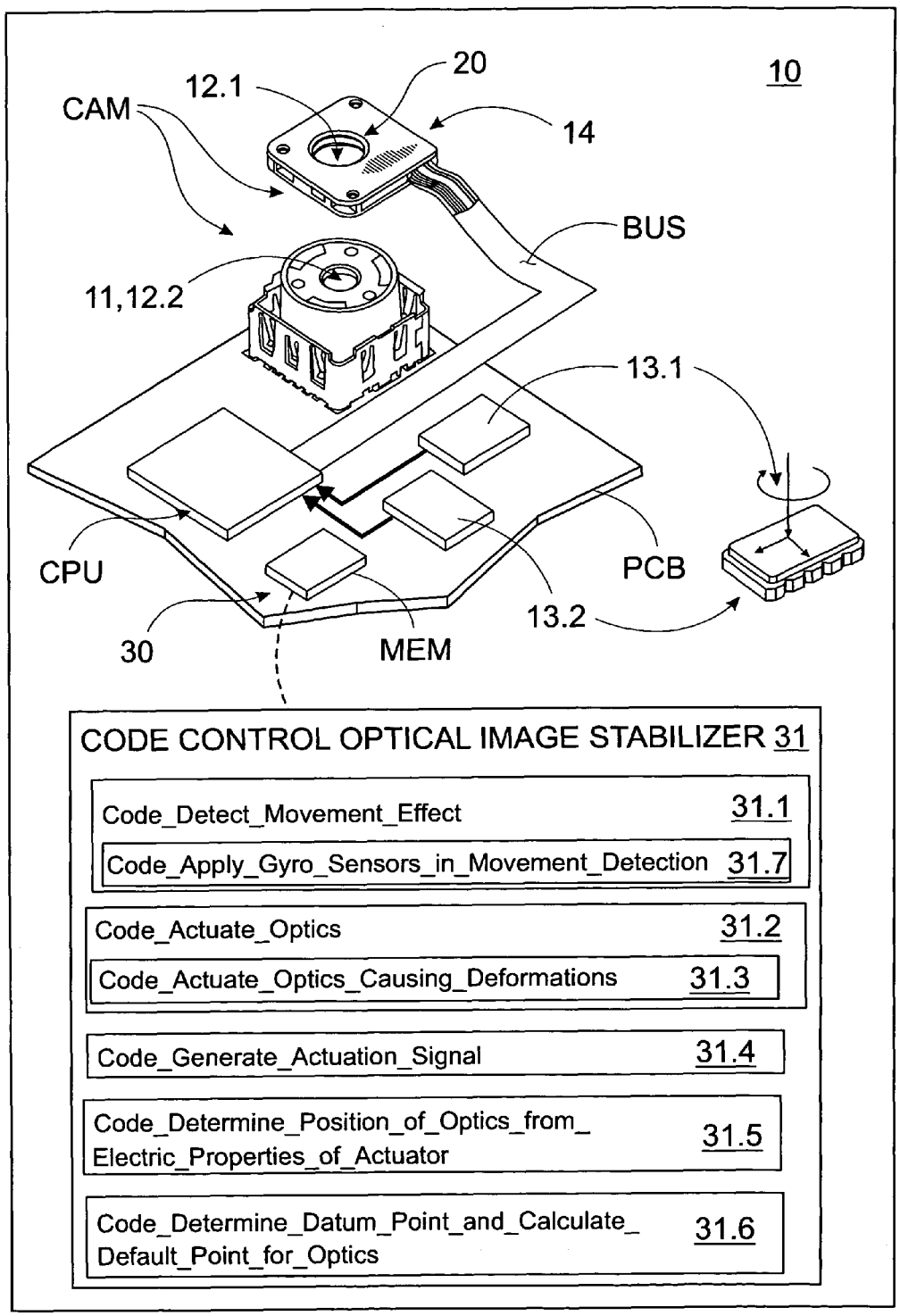
FIG. 1 is a rough schematic view of a basic application example of the electronic device and the program product to be arranged in connection with the electronic device according to the invention.

FIG. 1 shows an example of electronic device 10 according to the invention. In general, the device 10 according to the invention may be a portable digital camera device 10. More particular, the device 10 according to the invention may be, for example, mobile device, such as, for example, mobile phone, PDA device (Personal Digital Assistant) or some equivalent intelligent communication device ("smart device") equipped with camera unit CAM. Of course, the device 10 may also be digital camera without any special communication features. The properties of the camera unit CAM and imaging chain connected to that may permit several kind of imaging modes, such as, for example, still and/or video imaging.

Next the device 10 will be described in a manner that is more focused to the invention. For the skilled person, it is well known that the device 10 may also include other such functionalities, which are not required to describe in this application context more detailed manner. In addition, the function entities of the device 10 described hereinafter can, of course, take care out of many other matters and functions that which are considered to be relevant to describe in this connection in order to illuminate the basic idea of the invention.

In the general form the device 10 may include camera unit functionality CAM and control unit functionality, such as processor means CPU and data buses BUS arranged to connect them. These may be integrated on a common printed circuit board PCB.

The processor means may include one or several processor unit(s) CPU or corresponding by means of which are carried out the functions of the device 10 in one or more relations. In connection with the invention these measures are focused to the digital imaging, more particularly to the optical image stabilization procedure, which may be performed in connection with the digital imaging procedure.

The device 10 may also have one or more memories MEM in which may be store different kind of data. Some examples of these are output images that are produced by the device 10 and also program code 31. The program code 31 is arranged in connection with the device 10 in order to perform measures and operations according to the invention.

The camera unit CAM may include an image sensor 11, an optics 12.1, 12.2 for forming an image on the image sensor 11 and optical image stabilizer unit 14. The sensor's 11 type may be known as such like also the optics 12.1, 12.2. The optics 12.1, 12.2 may have means to adjust focal length (optical zoom). The device 10 may also have a digital viewfinder unit but that is not critical part considering the invention.

In addition, the device 10 includes also a detector 13.1, 13.2. The detector entity may be formed several individual detecting units 13.1, 13.1 for detecting a movement effect aimed to the device 10. The movement effect may be caused by an external source interacting to the device 10. The movement effect is detected particularly in connection with an imaging procedure that is performed by the device 10. The program code means 31.1 may take care out of operations relating to this detection.

The movement effect may mean in this connection, for example, the direction of shaking of the device 10. In general, the movement effect may be understood in connection with the invention as an effect, which is undesired and would cause harmful effects to the produced image. One example of such a harmful effect is blurring. The device 10 may have different sensitivities when considering the blurring effect. The sensitivity may depend on, for example, the used imaging program (exposure, for example).

Also, the external source may have different kind of forms. That may be caused by the user of the device 10. When the user presses capture button of the camera that may cause a tug for the device 10. When the user performs outdoor imaging, for example, at the winter he may shake due to the chilliness. The external source, which interacts with the device, may also be caused by user independently. For example, the wind effect may move the device in uncontrolled manner when the imaging is performed. Thus, examples of external sources may be several when considering the invention.

The optical image stabilizer unit 14 is arranged to actuate at least part of the optics 12.1. Unit 14 is arranged to the front of the sensor 11. The unit 14 and the sensor 11 have common optical axis. The primary optics 12.2 may be arranged between the sensor 11 and the unit 14. There may also be optics in front of the unit 14. Thus, the place of the unit 14 relative to other optics 12.1 is not limited to some particular arrangement but several orders may be possible.

The unit 14 may include at least one corrective lens 12.1 having free movement path at least in two-dimension being a plane perpendicular to optical axis. Of course, the lens 12.1 may also move in the direction of optical axis if that is also necessary. The purpose of the unit 14 is to compensate the detected movement effect caused by the external source on a real time basis. The stabilizer unit 14 will enable linear X-Y-movement for a lens 12.1 to balance the movement resulted from an external source (e.g. hand shaking). The amount of the movement of the lens 12.1 may be, for example, +/−0.5 mm in X- and Y-directions. The direction of the movement of the lens 12.1 is opposite to this one and it causes that the image forming on the sensor 11 will be clear, sharp and unblurred. The general principles of this compensation, for example, how this will optically take place between the optics 12.1, 12.2 and the sensor 11 is not needed to be described in this connection very deeply. Generally speaking, the one skilled in the art is well familiar with these principles, basics and "optical rules" based on which the correction and image formation on the sensor 11 will be happen. The idea of this invention is not depending of these generally known details. The program code means 31.2, 31.3 may take care out of operations relating to actuation of the unit 14.

In the invention the actuation of the optics 12.1 that is functionally arranged in connection with the stabilizer unit 14 is based on deformations arranged to take place in the optical image stabilizer unit 14. This enables precise compensation and also simplifies the mechanical and electrical implementation of the unit 14 and the device 10.

Based on the detection of the movement that may be caused by several reasons the device 10 is arranged to generate an actuation effect, for example, a signal, or in general, an excitation. This signal (for example, a voltage) is arranged to be supplied to the optical image stabilizer unit 14 in order to cause the deformations in it. The program code means 31.4 may take care out of operations relating to this.

Figure 2:
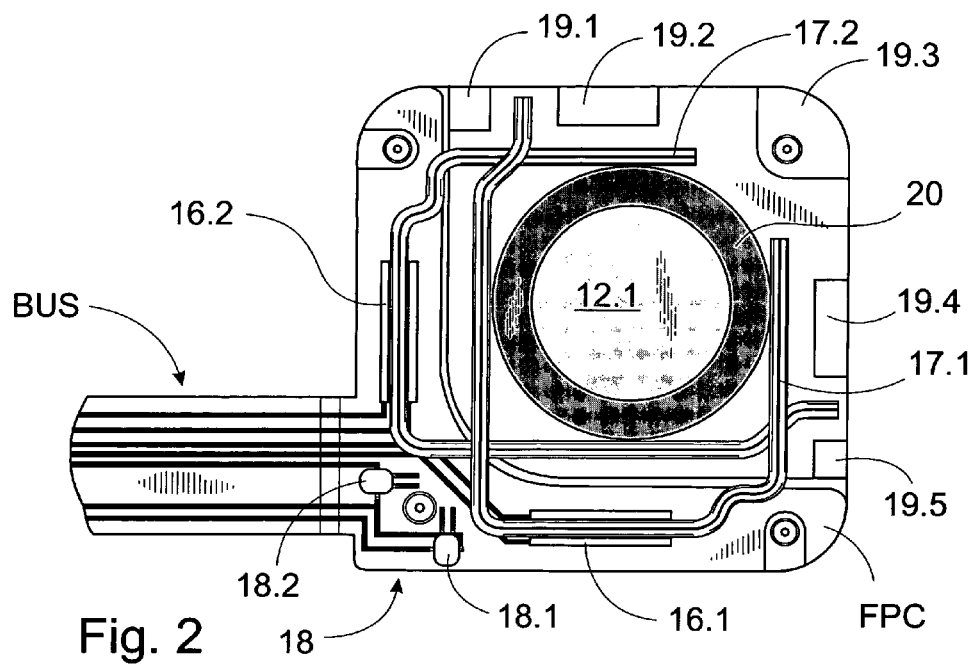
FIG. 2 shows an example of the optical image stabilizer unit according to the invention as opened.
Figure 5A:
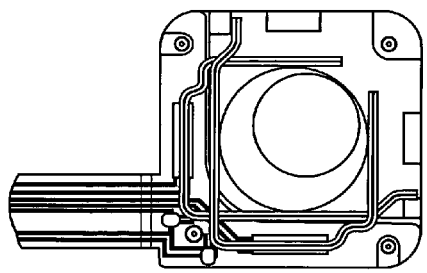
FIGS. 5*a*-5*d* show a position of lens and actuator members in their corner positions and FIGS. 6*a*-6*i* show examples of lens positions.
Figure 5B:
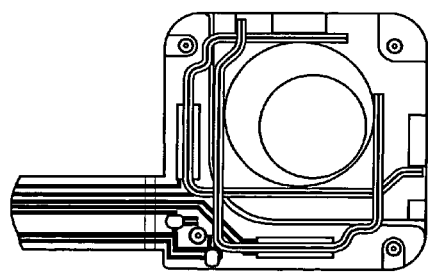
Figure 5C:
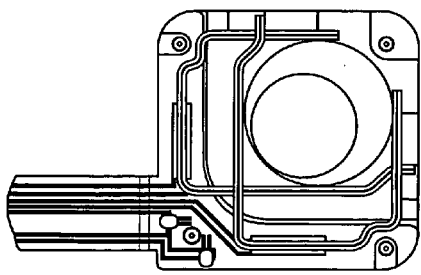
Figure 5D:
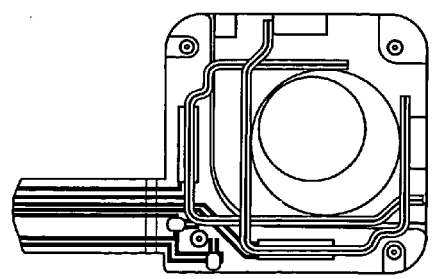
Figure 3:
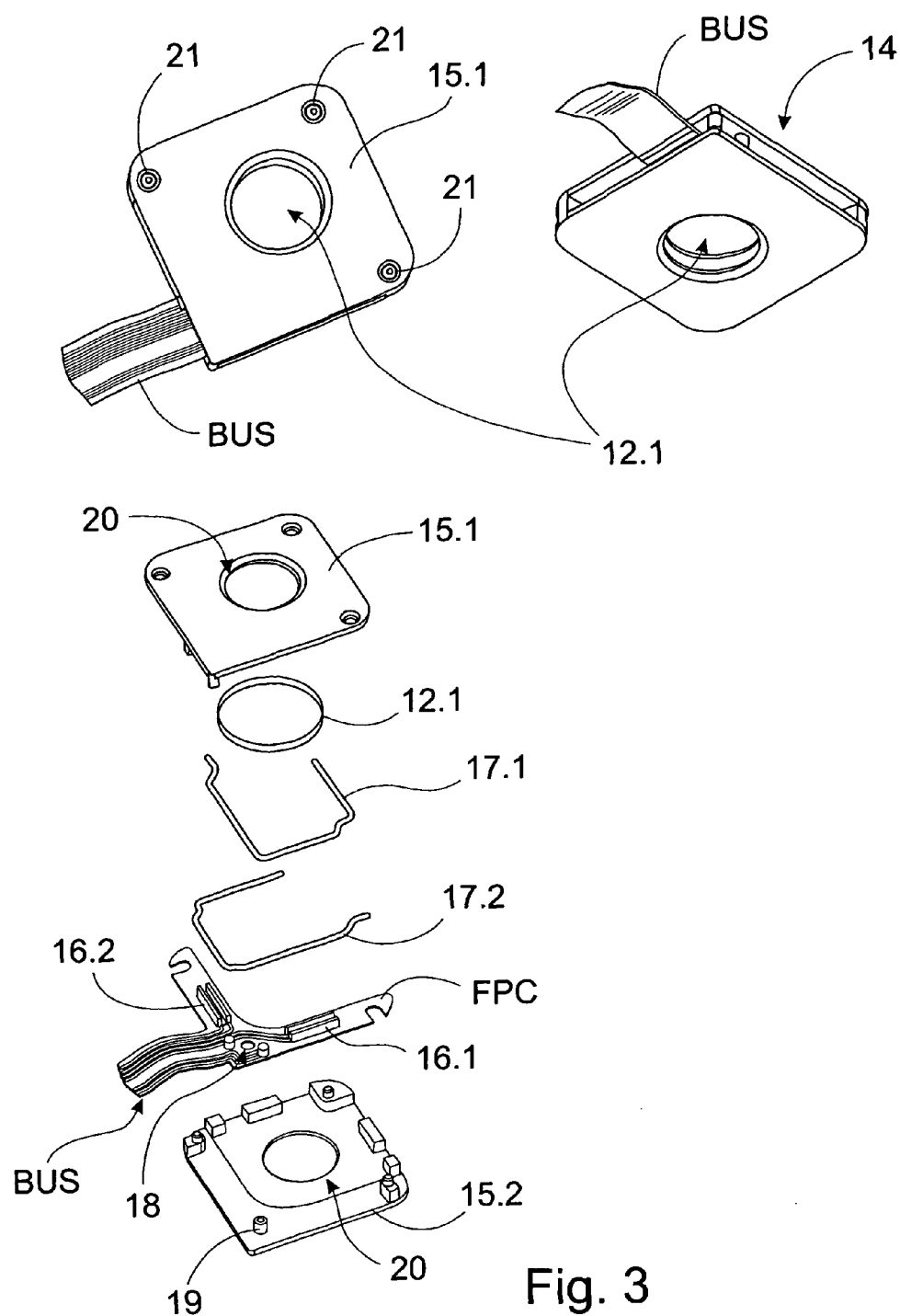
FIG. 3 shows an exploded view of the optical image stabilizer unit.
Figure 4:
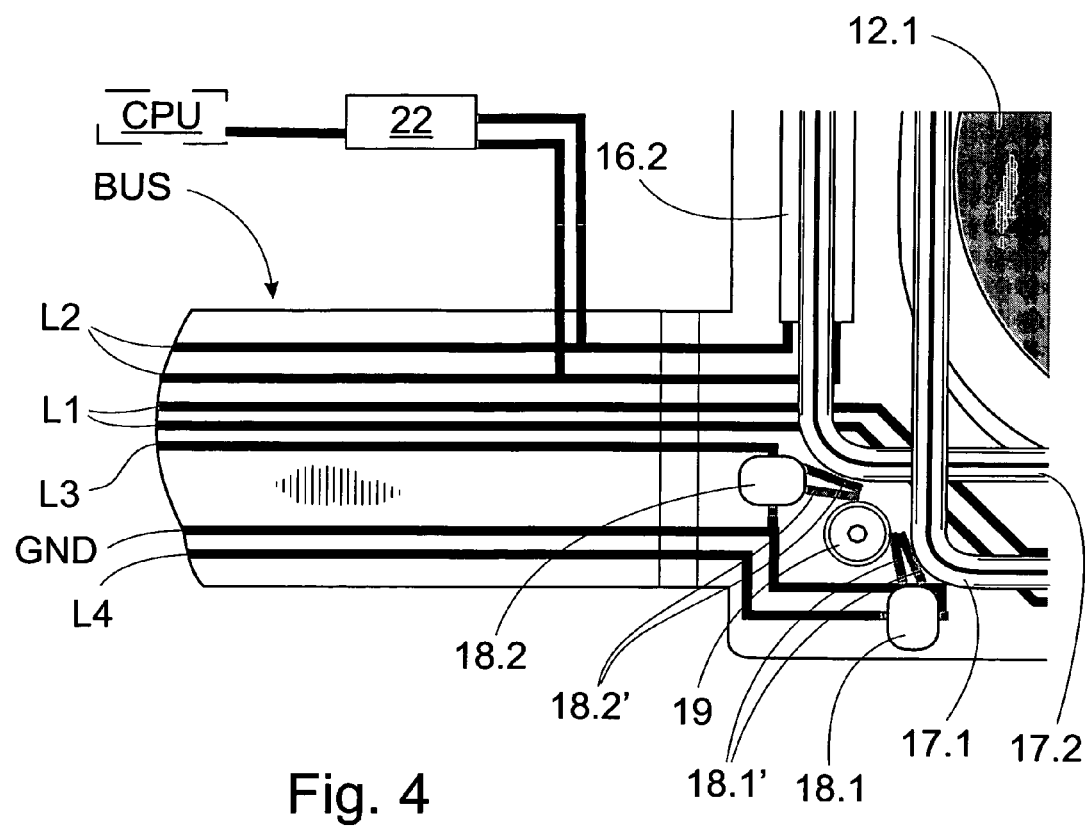
FIG. 4 shows an example of the reference point and the signal bus.

Next this optical image stabilizer unit 14 is described as one embodiment more precisely referring to FIGS. 2-4. It includes in the case of this embodiment a casing 15.1, 15.2, actuator means 16.1, 16.2, an signal bus BUS and at least two actuating members 17.1, 17.2. The actuator means 16.1, 16.2, the signal bus BUS and actuating members 17.1, 17.2 moved by the actuator means 16.1, 16.2 may be integrated on the flexible printed circuit FPC that is attached to cover 15.2. The FPC forms a solid base for the actuators 16.1, 16.2. Owing to this the invention may be suitable for mass production being an integrated entirety.

FIG. 2 presents an opened view in which the top cover 15.1 is removed from the unit 14 and FIG. 3 describes an exploded view about the components of the unit 14. More precisely, packaging of the unit 14 is made between two plastic covers 15.1, 15.2 that are joined together e.g. with adhesive from the fastening/alignment points 21 in each corner except one and also limiter structures 19.1-19.5 inside the unit 14. These parts 15.1, 15.2 cover the components of the unit 14. The top and bottom covers 15.1, 15.2 have an aperture 20 through which the light goes to the sensor 11. The lens element 12.1 is in connection with these apertures 20. The diameter of the lens 12.1 is slightly larger than the aperture 20. The diameter and the path of the lens 12.1 is fitted in such a manner that the image may be formed even the lens 12.1 is at its extreme position.

The actuator means 16.1, 16.2 are arranged inside the casing 15.1, 15.2. The operation of these actuator means 16.1, 16.2 are arranged to base on the deformations taking place in them.

The material of the actuators 16.1, 16.2 are selected from a group of piezo-ceramic materials, electroactive polymers or shape memory materials, for example. Generally, all kind of "smart materials" may be come into question in which will happen expansion and compression when power is supplied for activating that.

By applying these smart materials as actuators 16.1, 16.2 are achieved simple implementation. The actuator material itself may be commanded/controlled, for example, by a voltage, by a frequency or by a heat. These kind of signals or excitations cause expansion or compression in the material, i.e., in generally speaking, deformations.

The FPC forms the signal bus BUS for the actuator means 16.1, 16.2. The signal bus BUS includes now seven lines. By signal bus BUS at least the actuation signal is arranged to be supplied for the actuator means 16.1, 16.2. Other output and input signals may also be transferred by this bus BUS and its lines. The signal bus BUS is connected to processor unit CPU on the other end.

There are also at least two actuating members 17.1, 17.2 in the unit 14. These are moved perpendicularly relative to each other by the actuator means 16.1, 16.2 being now piezo actuators inside a plastic casing 15.1, 15.2. The lens 12.1 is secured to these actuating members 17.1, 17.2. The arm 17.1 moves the lens 12.1 horizontally i.e. in X-dimension. The arm 17.2 moves the lens 12.1 vertically i.e. in Y-dimension. It should be noted that the shafts 17.1, 17.2 may occur as such without any special frames or other construction arranged for them. This simplifies the structure of the unit 14. According to this embodiment the actuating members may be two metal arms 17.1, 17.2 by which the lens 12.1 is moved i.e. actuated.

According to one embodiment, the two dimensional position of the optics 12.1 arranged to the actuating members 17.1, 17.2 is arranged to be determined from the electrical properties of the actuator means 16.1, 16.2. The determination is arranged to be performed by using the signal bus BUS i.e. signal lines L1 and L2 of the piezo actuators 16.1, 16.2. This determination circuit 22 is presented schematically in FIG. 4. However, one skilled in the art understands that the CPU may perform this monitoring directly from the lines L1 and L2 without any special determination circuits or lines arranged for that reason. The program code means 31.5 may take care out of operations relating to this.

More particular, due to the reason that the actuator 16.1, 16.2 is actuated by the voltage i.e. that is between the closed electric circuit, it is possible to measure, for example, a resistance or capacitance or some other electrical variable provided by that. By interpreting the measure it is possible to determine the current position of the material and thus also the lens 12.1 which is connected to the material. This removes the need for some special detectors, such as, for example, optical detectors like photo reflector or photointerruptor which would otherwise complicate the system. The electroactive polymers, for example, may directly expand even couple of hundreds of percents causing that the automatic position detection is an automatic effect.

In FIG. 4 is also presented one example of the position calibration/initialization of the unit 14. The casing 15.1, 15.2 may be equipped with detector elements 18 for positioning the stabilizing unit 14, more particular, the lens 12.1. The detectors 18 are applied for fixing at least one reference point for the corrective lens 12.1 arranged in connection with the micro-displacement unit 14. The actuating members 16.1, 16.2 are arranged functionally in connection with the detector elements 18.

More precisely, on the FPC there may be mounted two miniature switches 18.1, 18.1', 18.2, 18.2' representing the detector elements. By using them is detected the datum point for the corrective lens system 12.1 in which there may be even several lenses. In this embodiment the datum point is existing on the left lower corner of the unit 14. During startup of the device 10 or the camera application the unit 14 can find this point and based on that calculate the centerpoint of the optics 12.1, relative to which the stabilization always may occur.

Both spring wire slider arms 17.1, 17.2 i.e. the actuating members push the switches 18.1', 18.2' so that they close and two signals are transmitted to the processor CPU to register the existing location of lens 12.1. The program code means 31.6 may take care out of operations relating to this detection and calculation of the datum point and current location based on this information. There may be three signal lines L3, L4 and common GND for these switches 18.1, 18.2 in the bus BUS. There are also an stopper body 19 on the FPC against which the switches 18.1', 18.2' arranged to the base elements 18.1, 18.2 press when the arm members 17.1, 17.2 are driven on this lower left corner. This kind of switch arrangement is very compact and it gives undoubtedly the required information needed for position calibration and calculation.

The detector for detecting a movement effect caused by an external source aimed to the device 10 may include, for example, one or more small gyro sensor elements 13.1, 13.2 which may be separate from each other. One schematic example of this kind of gyro and its detection dimensions is presented in FIG. 1. Some commercially available examples of possible gyros are Murata ENC-03 series and Epson XV3500-CB. These gyros 13.1, 13.2 are arranged to generate data indicating the detected movement effect, more particular, its amount, speed and direction, for example.

The device 10 is also equipped with a processor CPU as already generally described above. The processor CPU is arranged to generate the actuating signal for the optical image stabilizer unit 14. This control signal generation is performed based on the data i.e. information about movement effect caused by an external source and generated by the one or more small separate gyro elements 13.1, 13.2. The program code means 31.7 may take care out of operations relating to this. This information is transferred to the processor CPU via data lines described in FIG. 1. By using of this signal is then controlled the piezo actuators 16.1, 16.2 by using of which the lens 12.1 is moved to the opposite direction to correct the image. The program code means 31.4 apply data provided by the gyros 13.1, 13.2.

The casing 15.1, 15.2 may also be equipped with limiting structures 19.1-19.5. The limiters 19.1-19.5 are now on the side opposite to the actuators 16.1, 16.2. However, the limiters 19.1-19.5 are arranged in such a manner that they limit the movement of the arms 17.1, 17.2 in every direction. The meaning of these is to limit the movement of the actuating members 17.1, 17.2. The limiting structures 19.1-19.5 defines extreme locations for the optics 12.1 arranged to the actuating members 17.1, 17.2. The actuating arms 17.1, 17.2 extends now from at least one of their open end between these limiting structures 19.1, 19.2, 19.4, 19.5. On the other hand, the main sides of the arms 17.1, 17.2 rest against the structures 19.1, 19.2, 19.4, 19.5 in their extreme positions. The resting against the structures 19.1, 19.2, 19.4, 19.5 takes place with wide length, which supports also the optics 12.1.

By providing several stoppers 19.1-19.5 per one actuating member 17.1, 17.2 is achieved safe and reliable implementation of the unit 14 when considering the nature of use of the portable devices. There may occur even ~10 G external forces when a standard mobile phone drops from 1.5 m height. The limiters 19.1-19.5 having effect on each four side around the lens element 12.1 controls the movement of the lens 12.1 when drop occurs. These are used to prevent impact forces resulted from a floating lens 12.1 to the surrounding mechanics (actuators, switches).

The actuating member 17.1, 17.2 may be arranged to form an element having fairly a rectangular shape and from which one main side is removed. In this embodiment the floating lens 12.1 is between two U-shaped parts 17.1, 17.2 made from metal (e.g. bent wire or punched sheet metal). The piezo actuators 16.1, 16.2 of the U-shaped actuating member 17.1, 17.2 are arranged on the side opposite to this removed side. Two piezo-actuators 16.1, 16.2 are mounted on flexible printed circuit FPC. The lens 12.1 may be attached to the opposite main sides of the arms 17.1, 17.2. In the arms 17.1, 17.2 there may be bendings which take into account the inside structures of the unit 14 and also enables the controlled movement path for the lens 12.1 without damages to the inside mechanics.

The arms 17.1, 17.2 are arranged in such manner relative to each other that when one arm 17.1 moves the lens 12.1 by the piezo actuator 16.1 the lens 12.1 slides freely and steplessly between the other arm 17.2. Thus, the precise fit of the arms 17.1, 17.2 relative to each other also controls the movement of the lens 12.1. The function of the arms 17.1, 17.2 is besides of the medium of the actuating force in one dimension also to control the path of the lens 12.1 in another dimension i.e. to form linear guide for the lens 12.1. This also simplifies the mechanical construction.

There are commercially available piezo actuators for the purpose of the invention that can implement the required linear movement. SIDM-type (Smooth Impact Drive Mechanism) may be mentioned in this connection as an example of the operational principle of the piezo mechanism. By operating the piezos (or others actuator elements in which happen deformations) with suitable voltage signal (and voltage direction/waveform pattern), the lens 12.1 moves freely along X- and Y-axis between the sliders 17.1, 17.2. The signals supplied by lines L1 and L2 depend on the detected movement. The amount of detected movement in each dimension may diverge, so the signals may also have different measure between each other. Due to this the arms 17.1, 17.2 moves independently relative to each other. In the case of piezo ceramic actuators there will also happen these deformations. However, the expansion and compression/shrinking events may be small in the case of piezo applications and due to that reason there may also be some suitable transmission mechanism by means of which these small steps are chained together in order to implement the wished movement effect for the lens 12.1.

The form of the actuator 16.1, 16.2 may be such that the arms 17.1, 17.2 are between or inside them, in generally, connected to them. Also, the arms 17.1, 17.2 itself may possess deformation property. When compression or expansion occurs, the actuator 16.1, 16.2 forces the shaft 17.1, 17.2 into movement. The inside surface of the actuators 16.1, 16.2 and the outside surface of the arms 17.1, 17.2 may be treated in order to reduce the friction between them, if such a coaxial arrangement is applied between them. This is important to achieve stepless and continuous movement. The mechanical connection between the actuators 16.1, 16.2 and the arms 17.1, 17.2 puts the arms 17.1, 17.2 to linear movement relative to the actuators 16.1, 16.2.

When the stabilizer unit 14 according to the invention is powered up, two mechanical switches 18.1, 18.1', 18.2, 18.2' position the lens 12.1 and define the datum point. After this a separate gyro element(s) 13.1, 13.2 is used to measure the level and direction of vibration aimed to the device 10 based on which the processor CPU controls the stabilization effect.

In FIG. 1 is presented rough schematic view of application example of a program product 30 according to the invention. The program product 30 is intended to perform in connection with digital imaging according to the invention. The program product 30 may include a storing means, such as, a memory medium MEM and also a program codes 31 executable by the processor unit CPU of the device 10 and written in the memory medium MEM for dealing out image stabilization process in accordance with the method of the invention at least partly in the software level. The memory medium MEM for the program code 31 may be, for example, a static or dynamic application memory of the device 10, wherein it can be integrated directly in connection with the imaging chain or more specifically in connection with the control function of the optical image stabilizer unit 14.

The program code 31 may include several code means 31.1-31.7 described above, which can be executed by processor CPU and the operation of which can be adapted to the method descriptions just presented above. The code means 31.1-31.7 may form a set of processor commands executable one after the other, which are used to bring about the functionalities desired in the invention in the equipment 10 according to the invention. The invention itself does not have major impact on the basic principles of the optical image stabilization. The implementation details depend on the products and units applied therein.

FIGS. 5a-5d and 6a-6i presents stabilizer unit 14 in different positions. FIGS. 5a-5d describes the corner positions of the lens 12.1 and spring wire sliders 17.1, 17.2. From these can be easily see the limiting structures 19.1-19.5 and the movement path between these extreme locations.

Figures 6A, 6B, 6C, 6D, 6E, 6F, 6G, 6H, 6I:
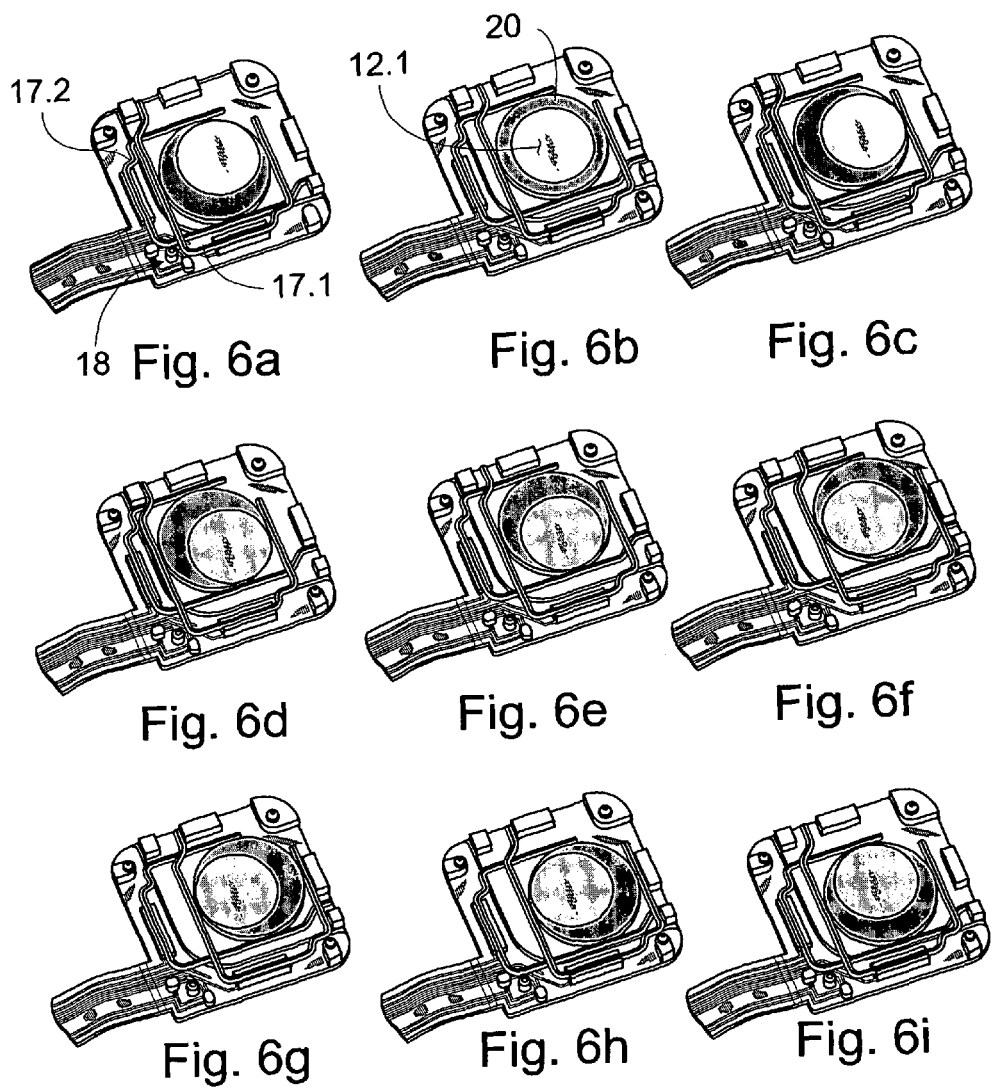

In FIG. 6a is presented the initialization position when device 10 is started and datum point determined. In FIG. 6b is presented the centre location to which the lens 12.1 is moved after determination of the datum point. FIGS. 6c-6i presents in clock-wise order the extreme positions of the lens 12.1. It should be understood that all intermediate locations between these extreme positions are also possible. Practically, the adjustment of the position of the lens 12.1 may be performed totally stepless.

There are several advantages which are achieved by the invention. Firstly the images are sharper in various imaging modes since the effect of shaking is now eliminated. When applying full zooming (=small aperture, narrow viewing cone) the shaking is the most visible, so this will be now minimized. Longer exposure times can be used in low-light conditions and images remain still sharp. Overall image quality is improved with higher resolutions. Unit according to the invention and to which the invention also relates as an independent totality has small overall size & reasonable amount of input signals. The dimensions of the unit 14 may be, for example, 10 mm×10 mm or even less. The thickness of the unit 14 may be, for example, even less than 1,5 mm. These features enable easy product integration (either as integrated inside a camera or being as a stand-alone device on top of camera). The presented mechanical solution implements the required imaging functions and results easy assembly structure that is cost- and labourwise. This is very important when considering the mass production of digital imaging devices, such as, mobile phones and digital cameras and as well as the optical image stabilizer units as such. In this application context the term "actuate" with its derivatives means practically the same as "moving".

It should be understood that the above specification and the figures relating to it are only intended to illustrate the present invention. Thus, the invention is not limited only to the embodiments presented above or to those defined in the claims, but many various such variations and modifications of the invention will be obvious to the professional in the art, which are possible within the scope of the inventive idea defined in the appended claims.

What is claimed is:

1. An apparatus comprising
an image sensor,
an optics configured to form an image on the image sensor,
a detector configured to detect a movement effect caused by an external source aimed at the apparatus in connection with an imaging procedure and
an optical image stabilizer unit configured to actuate at least part of the optics in order to compensate the detected movement effect caused by the external source, wherein
the actuation of the optics is based on deformations configured to take place in the optical image stabilizer unit, and the optical image stabilizer unit comprises a casing, an actuator configured inside the casing which operation is configured to be based on the deformations, a signal bus for the actuator wherein at least the actuation signal is configured to be supplied for the actuator and at least two actuating members configured to be moved perpendicularly relative to each other by the actuator and to which actuating members at least part of the optics is configured, and the actuating member is configured to form an element having a rectangular shape and from which one side is removed and the actuator of the actuating member is configured on the side opposite to the removed side.

2. The apparatus according to claim 1, wherein based on the detection the apparatus is configured to generate an actuation signal which is configured to be supplied to the optical image stabilizer unit in order to cause said deformations.

3. The apparatus according to claim 1, wherein the position of the optics configured to the actuating members is configured to be determined from the electrical properties of the actuator which determination is configured to be performed by using the signal bus.

4. The apparatus according to claim 1, wherein the casing is equipped with detector elements configured to fix at least one reference point for the optics configured in connection with the optical image stabilizer unit which actuating members are configured functionally in connection with the detector elements.

5. The apparatus according to claim 1, wherein
the detector configured to detect a movement effect caused by an external source aimed at the apparatus includes one or more gyro elements that are configured to generate data indicating the detected movement effect and
the apparatus is equipped with a processor that is configured to generate the actuating signal for the optical image stabilizer unit based on the data generated by the one or more gyro elements.

6. The apparatus according to claim 1, wherein the casing is equipped with limiting structures in order to limit the movement of the actuating members which limiting structures define extreme locations for the optics configured to the actuating members.

7. The apparatus according to claim 1, wherein the actuating member configured to actuate the optics in one dimension is also configured to form a linear guide for the optics in another dimension.

8. The apparatus according to claim 1, wherein the material of the actuator is selected from a group of piezo-ceramic materials, electroactive polymers or shape memory materials.

9. The apparatus according to claim 1, wherein the actuator, the signal bus and actuating members moved by the actuator is configured on a flexible printed circuit.

10. A method comprising:
in a digital imaging procedure, detecting a movement effect caused by an external source aimed at an apparatus and
at least part of optics configured to form an image on an image sensor is actuated based on the detected movement effect,
wherein actuation of the optics is based on deformations, and the deformations are configured to take place in an optical image stabilizer unit and based on the detected movement effect an actuation excitation is generated which is supplied to the optical image stabilizer unit in order to cause the deformations, and
wherein the path of the optics is limited by configuring limiting structures in the optical image stabilizer unit which comprises:
a casing,
an actuator configured inside the casing which operation is configured to be based on the deformations,
a signal bus for the actuator wherein at least the actuation signal is configured to be supplied for the actuator and
at least two actuating members configured to be moved perpendicularly relative to each other by the actuator and to which actuating members at least part of the optics is configured, and the actuating member is configured to form an element having a rectangular shape and from which one side is removed and the actuator of the actuating member is configured on the side opposite to the removed side.

11. The method according to claim 10, wherein the position of the optics is determined from the electrical properties of actuator by use of which the optics is actuated.

12. The method according to claim 10, wherein at least one reference point is determined for the optics configured in connection with the optical image stabilizer unit according to which reference point the current position of the optics is actuated.

13. An apparatus comprising:
an optical image stabilizer unit configured for an electronic device including a camera unit which camera unit includes an image sensor and an optics configured to form an image on the image sensor, and which said optical image stabilizer unit is configured to actuate at least part of the optics in order to compensate the detected movement effect caused by the external source, wherein the actuation of the optics is based on deformations configured to be taken place in the optical image stabilizer unit, and the optical image stabilizer unit further comprises:
a casing,
an actuator configured inside the casing which operation is configured to be based on the deformations,
a signal bus configured for the actuator wherein at least the actuation signal is configured to be supplied to the actuator and
at least two actuating members configured to be moved perpendicularly relative to each other by the actuator and to which actuating members at least part of the said optics is configured, and
the actuating member is configured to form an element having a rectangular shape and from which one side is removed and the actuator of the actuating member is configured on the side opposite to the removed side.

14. The apparatus according to claim 13, wherein the position of the optics configured to the actuating members is configured to be determined from the electrical properties of the actuator which determination is configured to be performed by using the signal bus.

15. The apparatus according to claim 13, wherein the casing is equipped with detector elements configured to fix at least one reference point for the optics configured in connection with the optical image stabilizer unit which actuating members are configured functionally in connection with the detector elements.

16. The apparatus unit according to claim 13, wherein the casing is equipped with limiting structures in order to limit the movement of the actuating members which limiting structures define extreme locations for the optics configured to the actuating members.

17. The apparatus according to claim 13, wherein the actuating member configured to actuate the optics in one dimension is also configured to form a linear guide for the optics in another dimension.

18. The apparatus according to claim 13, wherein the material of the actuator is selected from a group of piezo-ceramic materials, electroactive polymers or shape memory materials.

19. The apparatus according to claim 13, wherein the actuator, the signal bus and actuating members moved by the actuator are configured on a flexible printed circuit.

20. A computer program product configured to actuate an optical image stabilizer unit in an electronic device including a camera unit, which program product includes a storage apparatus and a program code executable by a processor and written in the storage apparatus, and which program code includes:

- a first code configured to detect a movement effect caused by an external source aimed at the device in connection with an imaging procedure and
- a second code means configured to actuate at least part of the optics configured to form an image on an image sensor by the optical image stabilizer unit which actuation is configured to base on the detected movement effect, wherein the program code includes a third code configured to cause deformations in connection with the optical image stabilizer unit in order to actuate the optics, and the optical image stabilizer unit comprises a casing, an actuator configured inside the casing which operation is configured to be based on the deformations, a signal bus for the actuator wherein at least the actuation signal is configured to be supplied for the actuator and at least two actuating members configured to be moved perpendicularly relative to each other by the actuator and to which actuating members at least part of the optics is configured, and the actuating member is configured to form an element having a rectangular shape and from which one side is removed and the actuator of the actuating member is configured on the side opposite to the removed side.

21. The program product according to claim 20, wherein the program code includes a fourth code configured to generate an actuation signal based on the detection of the movement effect which is configured to be supplied to the optical image stabilizer unit in order to cause the deformations.

22. The program product according to claim 20, wherein the program code comprises a fifth code configured to determine the position of the optics from the electrical properties of the actuator of the optical image stabilizer unit which determination is configured to be performed by using a signal bus of the actuation signal.

23. The program product according to claim 20, wherein the program code includes a sixth code configured to detect at least one reference point for the optics configured in connection with the optical image stabilizer unit according to which the current position of the optics is actuated.

24. The program product according to claim 21, wherein the program code includes a seventh code configured to determine the movement effect caused by an external source aimed at the device by using one or more gyro elements that are configured to generate data indicating the detected movement effect and which the fourth code is configured to generate the actuating signal for the optical image stabilizer unit based on the data generated by the one or more gyro elements.

25. An apparatus comprising:

a processor, memory including computer program code, the memory and the computer program code configured to, with the processor, cause the apparatus at least to perform:

in a digital imaging procedure, detecting a movement effect caused by an external source aimed at the apparatus and at least part of optics configured to form an image on an image sensor is actuated based on the detected movement effect, wherein actuation of the optics is based on deformations, and the deformations are configured to take place in an optical image stabilizer unit and based on the detected movement effect an actuation excitation is generated which is supplied to the optical image stabilizer unit in order to cause the deformations, and wherein the path of the optics is limited by configuring limiting structures in the optical image stabilizer unit which comprises:

a casing, an actuator configured inside the casing which operation is configured to be based on the deformations, a signal bus for the actuator wherein at least the actuation signal is configured to be supplied for the actuator and at least two actuating members configured to be moved perpendicularly relative to each other by the actuator and to which actuating members at least part of the optics is configured, and the actuating member is configured to form an element having a rectangular shape and from which one side is removed and the actuator of the actuating member is configured on the side opposite to the removed side.

* * * * *